W. R. NICOLL & W. J. McLAUGHLIN.
MOISTURE TESTER.
APPLICATION FILED MAR. 2, 1916.
1,249,808.
Patented Dec. 11, 1917.
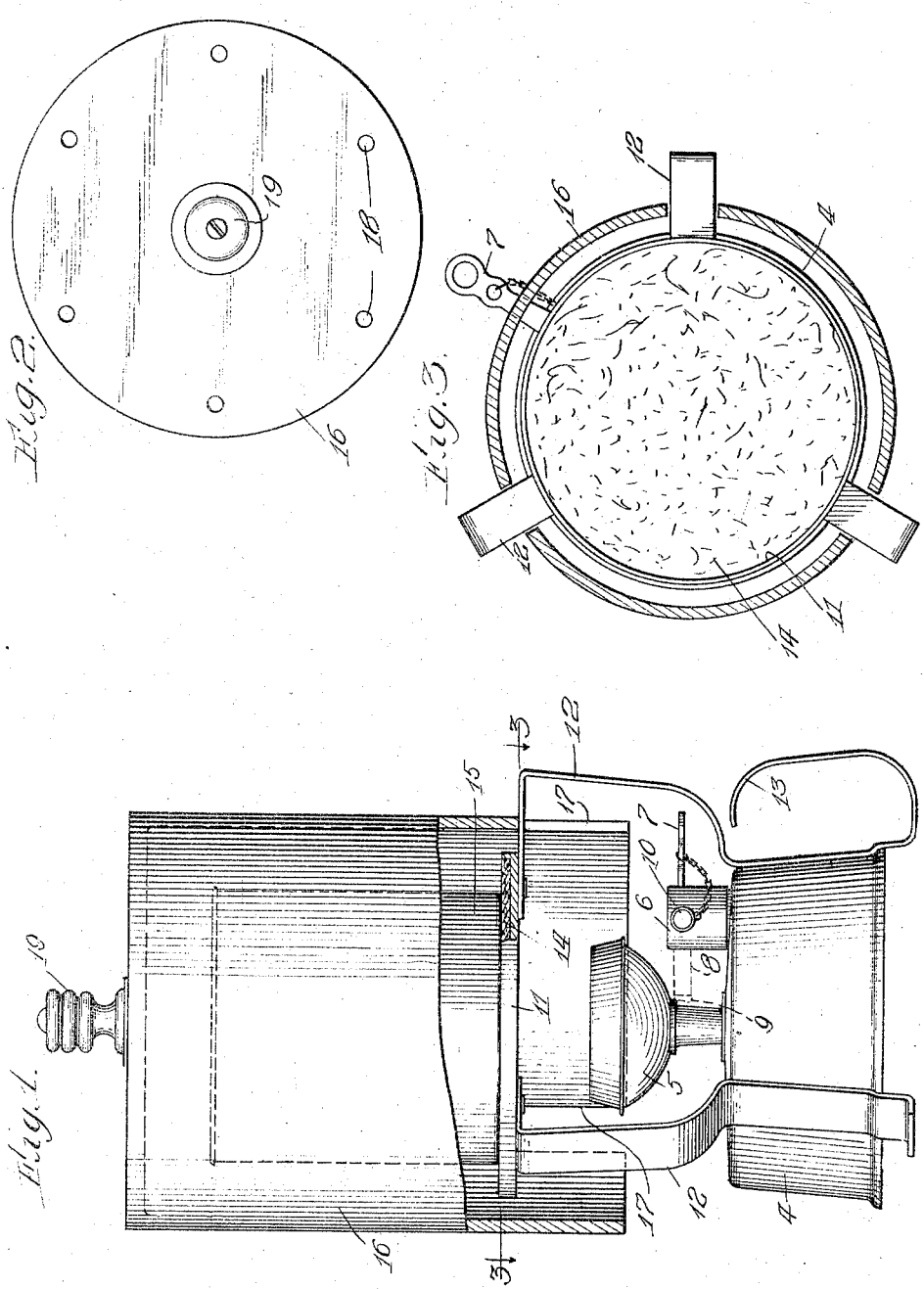

UNITED STATES PATENT OFFICE.

WILLIAM R. NICOLL AND WILLIAM J. McLAUGHLIN, OF OWATONNA, MINNESOTA, ASSIGNORS TO MINNETONNA COMPANY, OF OWATONNA, MINNESOTA, A CORPORATION OF MINNESOTA.

MOISTURE-TESTER.

1,249,808.  Specification of Letters Patent.  Patented Dec. 11, 1917.

Application filed March 2, 1916. Serial No. 81,763.

*To all whom it may concern:*

Be it known that we, WILLIAM R. NICOLL and WILLIAM J. McLAUGHLIN, both citizens of the United States, residing at Owatonna, in the county of Steele and State of Minnesota, have invented certain new and useful Improvements in Moisture-Testers, of which the following is a specification.

This invention relates to an evaporating device, and although it may have a general application it is particularly designed and intended for use as a moisture tester for butter for determining the amount or per cent. of moisture which is contained in a given sample of butter. The principal object of the invention is to provide a new and improved construction, combination and arrangement of parts for accomplishing the desired result.

In the accompanying drawings, Figure 1 is an elevation, with part of the shell broken away, of a moisture tester constructed in accordance with the principles of our invention; Fig. 2 is a top view of the shell, and Fig. 3 is a sectional view taken on the line 3—3 of Fig. 1.

Pure food laws require that there shall be no more than a certain percentage of moisture in butter. The present invention offers a simple and very efficient device for quickly testing and determining the amount of moisture in any given or weighed sample of butter which operates so quickly and efficiently that a number of samples may be tested while the butter is being worked.

Referring more particularly to the drawings, a heater of any desired kind may be employed, it being preferable to use one which produces a hot flame, such as an alcohol heater. In Fig. 1 the burner comprises a fuel receptacle 4 with a burner 5 extending above it. Mounted at the side of the burner is a rotatable cap 6 with a handle 7 for rotating it and an extending hollow arm 8 which carries a wick 9. A cap 10 is also provided for covering and extinguishing the flame from the wick when desired. The cap is removed, the wick ignited and turned below the burner 5 which becomes sufficiently heated to vaporize the fuel thereby producing a hot flame above the burner 5.

A plate 11 is supported directly above the burner 5 by means of arms 12 which extend outwardly from the plate and are removably secured to the receptacle 4, one of them forming a handle 13. This plate 11 is preferably formed with a recess in its top in which a pad 14 of non-metallic and non-burning substance, such for example, as asbestos, is placed. A receptacle 15 open at the top is supported by the plate 11 on the pad 14.

Extending loosely over the plate 11 and the testing receptacle 15 is a shell 16 which is formed with slots 17 in the lower edge corresponding in position to the arms 12 so that the arms may be seated in the slots supporting the lower edge of the shell below the plate 11 and below the upper surface of the burner 5. This is for the purpose of protecting the burner from drafts and the like and for saving all the heat and properly directing it to the testing receptacle. The top of the shell 16 is closed, preferably constituting an integral part thereof but a plurality of perforations 18 are provided about the edge through which heat and moisture may escape at the top of the shell. A knob 19 is secured to the top of the shell for conveniently handling it. This shell is made of metal, preferably of some metal which is a good conductor of heat, such as aluminum, and as it fits the plate 11 loosely a direct passage for heated air will be formed from the bottom of the shell up the sides thereof and through the perforations 18. This produces a draft about the testing receptacle 15 which carries away all moisture from the receptacle as soon as it is evaporated therefrom in the form of vapor.

The operation of the device is very simple; a weighed sample of butter or other material of which it is desired to test the moisture is placed in the receptacle and the shell 16 is placed about the receptacle and over the heater until all the moisture is evaporated therefrom. The sample is then weighed and the reduction in weight will indicate the amount of moisture which the sample contained. The heat from the burner is very efficiently applied to the receptacle because of the shell 16 which evenly distributes the heat and by the plate 11, the butter fat being prevented from burning by the asbestos pad 14 and all moisture being quickly carried off through the apertures at the top of the shell.

What we claim is:

1. In a moisture tester, a heater having a supporting plate and arms projecting therefrom, and a shell with slots at the lower end which fit loosely around the plate and is supported by the arms.

2. In a moisture tester, a support for a testing receptacle with arms extending outwardly therefrom, and a shell with recesses at the lower end to register with the arms fitting loosely over the support and supported by the arms with the lower edge below the support.

3. In a moisture tester, a heater and a support above the heater with laterally projecting arms, and a shell having a closed top and an open bottom which fits loosely around the support and is upheld by the said arms.

4. In a moisture tester, a heater, a plate above the heater with extending arms, and a shell fitting loosely around the plate and supported by the arms with a perforated top for the escape of moisture.

5. In a moisture tester, the combination with a heater, a plate upon which a testing receptacle is supported, arms extending from the plate to support it above the heater, and a shell adapted to fit loosely about the plate having slots at the bottom adapting it to be supported by the arms and to extend below the support for properly protecting the heater, and a perforated top for the shell through which heat and moisture may escape.

6. In a moisture tester, the combination with a plate for supporting a testing receptacle, a heater comprising a burner disposed below the plate, supporting arms extending from the plate, and a shell open at one end and having perforations at the other fitting loosely over the said plate and supported by the arms so that the lower end of the shell extends below the plate and below the top of the burner to protect it.

7. In a moisture tester, the combination with a heater, a plate with projecting arms disposed above the heater, a moisture testing receptacle supported above the plate, and a shell fitting loosely over the plate and receptacle supported by the arms having a perforated top through which hot air from the heater and moisture from the receptacle pass.

8. A moisture tester comprising a heater, a heat retaining shell open at the bottom and having perforations at the top, a moisture testing receptacle, a heating plate supported above the heater and fitting loosely within the shell, means for loosely supporting the shell by the lower edge and a non-burning pad affixed to the plate and interposed between it and the said receptacle.

9. A moisture tester comprising a heater with an upright burner, a plate disposed above the burner, arms extending from the plate to space it from the burner, a receptacle supported by the plate, a shell fitting loosely over the plate and having slots at the lower edge corresponding in position to the said supporting arms whereby the shell is supported by the arms with the lower edge thereof below the top of the burner, the said shell having a top with perforations therein, and a knob at the top for raising and lowering the shell.

10. In a moisture tester, the combination with a heater, of a plate supported above it and a metal shell adapted to fit loosely over the plate and extending above and below the plate, the lower portion of the shell being open and for protecting the heater and the upper end of the shell being closed but provided with perforations to allow heat and moisture to escape therefrom.

11. In a moisture tester, the combination with a support for a testing receptacle, a shell open at the bottom and having perforations at the top which fits loosely over the said support, and means for supporting both the shell and the plate above the heater, the said heater comprising a burner and a generator for said burner comprising a rotatable member with a wick.

12. In a moisture tester, the combination with a heater, a heating plate, a testing receptacle, a non-burning pad disposed on the plate between the plate and the receptacle, and a shell supported by its lower edge fitting loosely over the plate and receptacle with perforations in the top for the escape of heat and moisture.

In testimony whereof we have signed our names to this specification, in the presence of two subscribing witnesses, on this 26th day of Feb., A. D. 1916.

WILLIAM R. NICOLL.
WILLIAM J. McLAUGHLIN.

Witnesses:
 CARL K. BENNETT,
 F. C. KINYON.